United States Patent
Van Den Berg et al.

(10) Patent No.: US 6,548,565 B1
(45) Date of Patent: Apr. 15, 2003

(54) NON-AQUEOUS COATING COMPOSITION BASED ON AN OXIDATIVELY DRYING ALKYD RESIN AND A PHOTO-INITIATOR

(75) Inventors: Keimpe Jan Van Den Berg, Sassenheim (NL); Huig Klinkenberg, Katwijk aan Zee (NL); Arie Noomen, Voorhout (NL)

(73) Assignee: Akzo Nobel NV, Arnhem (NL)

( * ) Notice: Subject to any disclaimer, the term of this patent is extended or adjusted under 35 U.S.C. 154(b) by 0 days.

(21) Appl. No.: 09/659,871

(22) Filed: Sep. 13, 2000

Related U.S. Application Data

(63) Continuation of application No. PCT/EP99/01136, filed on Feb. 23, 1999.

(30) Foreign Application Priority Data

Mar. 13, 1998 (EP) .............................................. 98200801

(51) Int. Cl.[7] .................... C08F 2/46; C09D 167/08; C08G 63/48; C08G 63/49
(52) U.S. Cl. ................ 522/17; 522/18; 522/20; 522/59; 522/64; 522/104; 522/105; 522/108; 522/179; 522/181; 522/172; 526/323; 526/323.1; 526/323.2; 528/26.5; 528/245.5; 528/295.5
(58) Field of Search .................. 522/18, 17, 20, 522/59, 64, 96, 97, 104, 107, 179, 181, 105, 108; 528/245.5, 295.5, 26.5; 526/323, 323.1, 323.2

(56) References Cited

U.S. PATENT DOCUMENTS

| | | | |
|---|---|---|---|
| 3,373,160 A | | 3/1968 | Ikeda .......................... 260/248 |
| 3,825,428 A | | 7/1974 | Davidson .................... 96/91 N |
| 4,292,152 A | | 9/1981 | Lechtken et al. ...... 204/159.15 |
| 4,298,738 A | | 11/1981 | Lechtken et al. ............. 546/22 |
| 4,324,744 A | | 4/1982 | Lechtken et al. ............. 260/932 |
| 4,377,676 A | * | 3/1983 | Gauthier et al. .............. 106/264 |
| 4,385,109 A | | 5/1983 | Lechtken et al. ............. 430/306 |
| 4,409,077 A | * | 10/1983 | Sakiyama et al. |
| 4,540,598 A | | 9/1985 | Berner et al. ............... 427/54.1 |
| 4,710,523 A | | 12/1987 | Lechtken et al. ............. 522/14 |
| 4,736,055 A | | 4/1988 | Dietliker et al. ............. 560/13 |
| 4,737,593 A | | 4/1988 | Ellrich et al. ................ 568/15 |
| 4,792,632 A | | 12/1988 | Ellrich et al. ................ 568/15 |
| 5,039,740 A | * | 8/1991 | Anderson et al. .............. 525/7 |
| 5,218,009 A | | 6/1993 | Rutsch et al. ................ 522/16 |
| 5,286,835 A | | 2/1994 | Green et al. ................ 528/272 |
| 5,334,456 A | * | 8/1994 | Noren et al. |
| 5,602,204 A | * | 2/1997 | Harimoto et al. ........... 525/100 |
| 5,661,219 A | * | 8/1997 | Nakame et al. |
| 6,005,017 A | * | 12/1999 | Daly et al. |
| 6,127,447 A | * | 10/2000 | Mitry et al. |
| 6,218,448 B1 | * | 4/2001 | Kraaijevanger et al. ...... 524/31 |

FOREIGN PATENT DOCUMENTS

| | | | |
|---|---|---|---|
| EP | 0 007 508 | 2/1980 | ............. C07F/9/53 |
| EP | 0 009 356 | 4/1980 | ............. C09D/3/49 |
| EP | 0 139 609 | 5/1985 | ............. C08K/5/42 |
| EP | 0 164 314 | 12/1985 | ......... C07C/161/00 |
| EP | 0 184 095 | 6/1986 | ............. C07F/9/53 |
| EP | 0 199 672 | 10/1986 | ......... C07C/143/68 |
| EP | 0 234 641 | 9/1987 | ............. C09D/3/64 |
| EP | 0 413 657 | 2/1991 | ............. C07F/9/53 |
| EP | 0 571 330 | 11/1993 | ............. G03F/7/004 |
| EP | 0 780 729 | 6/1997 | ............. G03F/7/004 |
| GB | 1 423 408 | 2/1976 | ............. C08G/63/76 |
| GB | 2 259 704 | 3/1993 | ............. C07F/9/53 |
| GB | 2 292 740 | 3/1996 | ............. C07F/9/53 |
| GB | 2 306 958 | 5/1997 | ......... C07C/381/00 |

OTHER PUBLICATIONS

G. Li Bassi et al. *Photoinitiators for the simultaneous generation of free radicals and acid hardening catalyst*, Chemicals, 1987.

J. March, *Advanced Organic Chemistry, Reaction, Mechanism and Structure*, 4th Ed Wiley Interscience, 1992, p. 795.

* cited by examiner

*Primary Examiner*—Susan W. Berman
(74) *Attorney, Agent, or Firm*—Lainie E. Parker

(57) ABSTRACT

A non-aqueous coating composition based on an oxidatively drying alkyd resin and a photo-initiator. An acid or latent acid and one or more compounds of the group of vinyl ethers, acetals, and alkoxysilanes which are reactive in the presence of an acid are incorporated into the coating composition. The vinyl ethers, acetals, and alkoxysilanes preferably are covalently bounded to the alkyd resin. The ratio of the number of oxidatively drying groups present in the alkyd resin to the number of groups reactive in the presence of an acid preferably is in the range of 1/10 to 15/1. The acid preferably is the phosphoric acid dibutyl ester.

14 Claims, No Drawings

NON-AQUEOUS COATING COMPOSITION BASED ON AN OXIDATIVELY DRYING ALKYD RESIN AND A PHOTO-INITIATOR

This application is a continuation of PCT/EP99/01136 filed Feb. 23, 1999.

BACKGROUND OF THE INVENTION

The invention pertains to a non-aqueous coating composition based on an oxidatively drying alkyd resin and a photo-initiator.

Such a coating composition has been proposed before in EP-A-234 641. The composition described in the document comprises an oxidatively drying alkyd resin of comparatively low-molecular weight and an allyl ether group covalently bonded thereto, a siccative such as a cobalt salt and/or zirconium salt and, optionally, a photo-initiator.

A drawback to the coating compositions described in the document is that curing at temperatures of 10° C. or lower, in particular of thick coats, is not satisfactory. A further drawback to the known coating compositions is that on curing acrolein is released.

SUMMARY OF THE INVENTION

The invention now provides a coating composition which can be cured without any problems also at low temperatures even after it has been applied as a somewhat thicker coat.

The invention incorporates an acid or latent acid and one or more compounds belonging to the group of vinyl ethers, acetals, and alkoxysilanes which are reactive in the presence of an acid into a coating composition of the known type mentioned in the opening paragraph.

It should be noted that EP-A-234 641 mentions in passing the possibility to modify the employed alkyd resins with compounds preferably having at least two reactive groups, such as polyisocyanates or polyalkoxysilanes. However, the reactivity of these groups is intended for their reaction with the functional groups present in the alkyd resin during the preparation of the resin.

DETAILED DESCRIPTION OF THE INVENTION

At least part of the alkyd resin composition optionally comprising several alkyd resins in the non-aqueous coating compositions according to the invention is oxidatively drying as a result of incorporating a large number of unsaturated, aliphatic compounds, at least a portion of which is poly-unsaturated. The unsaturated aliphatic compounds preferably are unsaturated aliphatic monocarboxylic acids, more particularly poly-unsaturated aliphatic monocarboxylic acids. Examples of mono-unsaturated fatty acids are myristoleic acid, palmitoleic acid, oleic acid, gadoleic acid, erucic acid, and ricinoleic acid. Preferably use is made of fatty acids containing conjugated double bonds, such as dehydrated ricinus oil fatty acid and/or wood oil fatty acid. Other monocarboxylic acids suitable for use include tetrahydrobenzoic acid and hydrogenated or non-hydrogenated abietic acid or its isomer. If so desired, the monocarboxylic acids in question may be used wholly or in part as triglyceride, e.g., as vegetable oil, in the preparation of the alkyd resin. If so desired, mixtures of two or more of such monocarboxylic acids or triglycerides may be employed, optionally in the presence of one or more saturated, (cyclo) aliphatic or aromatic monocarboxylic acids, e.g., pivalic acid, 2-ethylhexanoic acid, lauric acid, palmitic acid, stearic acid, 4-tert.butyl-benzoic acid, cyclopentane carboxylic acid, naphthenic acid, cyclohexane carboxylic acid, 2,4-dimethyl benzoic acid, 2-methyl benzoic acid, and benzoic acid.

If so desired, also polycarboxylic acids may be incorporated into the alkyd resin, such as phthalic acid, isophthalic acid, terephthalic acid, 5-tert.butyl isophthalic acid, trimellitic acid, pyromellitic acid, succinic acid, adipic acid, 2,2,4-trimethyl adipic acid, azelaic acid, sebacic acid, dimerised fatty acids, cyclopentane-1,2-dicarboxylic acid, cyclohexane-1,2-dicarboxylic acid, 4-methylcyclohexane-1,2-dicarboxylic acid, tetrahydrophthalic acid, endomethylene-cyclohexane-1,2-dicarboxylic acid, butane-1,2,3,4-tetracarboxylic acid, endoisopropylidene-cyclohexane-1,2-dicarboxylic acid, cyclohexane-1,2,4,5-tetracarboxylic acid, and butane-1,2,3,4-tetracarboxylic acid. If so desired, the carboxylic acids in question may be used as anhydrides or in the form of an ester, e.g., an ester of an alcohol having 1–4 carbon atoms.

In addition, the alkyd resin can be composed of di- or polyvalent hydroxyl compounds. Examples of suitable divalent hydroxyl compounds are ethylene glycol, 1,3-propane diol, 1,6-hexane diol, 1,12-dodecane diol, 3-methyl-1,5-pentane diol, 2,2,4-trimethyl-1,6-hexane diol, 2,2-dimethyl-1,3-propane diol, and 2-methyl-2-cyclohexyl-1,3-propane diol. Examples of suitable triols are glycerol, trimethylol ethane, and trimethylol propane. Suitable polyols having more than 3 hydroxyl groups are pentaerythritol, sorbitol, and etherification products of the compounds in question, such as ditrimethylol propane and di-, tri-, and tetrapentaerythritol. Preferably, use is made of compounds having 3–12 carbon atoms, e.g., glycerol, pentaerythritol and/or dipentaerythritol.

The alkyd resins can be obtained by direct esterification of the constituent components, with the option of a portion of these components having been converted already into ester diols or polyester diols. Alternatively, the unsaturated fatty acids can be added in the form of a drying oil, such as linseed oil, tuna fish oil, dehydrated castor oil, coconut oil, and dehydrated coconut oil. Transesterification with the other added acids and diols will then give the final alkyd resin. This transesterification generally takes place at a temperature in the range of 115 to 250° C., optionally with solvents such as toluene and/or xylene also present. The reaction generally is carried out in the presence of a catalytic amount of a transesterification catalyst. Examples of transesterification catalysts suitable for use include acids such as p-toluene sulphonic acid, a basic compound such as an amine, or compounds such as calcium oxide, zinc oxide, tetraisopropyl orthotitanate, dibutyl tin oxide, and triphenyl benzyl phosphonium chloride. The number average molecular weight of the alkyd resin thus prepared preferably is at least 1000 and not more than 2800; favourable results can also be achieved at higher molecular weights, but this will be at the expense of the solids content in the final coating composition.

The vinyl ether, acetal and/or alkoxysilane compounds used according to the invention preferably contain at least two vinyl ether, acetal and/or alkoxysilane groups and have a molecular weight of 150 or higher. Since most commercially available vinyl ether, acetal and/or alkoxysilane compounds contain only one vinyl ether, acetal and/or alkoxysilane group and in addition at most one functional amino, epoxy, thiol, isocyanate, acrylic, hydride or hydroxyl group, first an adduct is formed of such a compound to a compound having at least two groups capable of reacting with an amino, epoxy, thiol, isocyanate, acrylic, hydride or hydroxyl group. As examples may be mentioned compounds having an epoxy, isocyanate, hydroxyl and/or ester group or compounds with an ethylenically or ethynylenically unsaturated group incorporated therein.

Examples of at least difunctional, solid or liquid epoxy compounds suitable for use in the adduct in question include the di- or polyglycidyl ethers of (cyclo)aliphatic or aromatic hydroxy compounds such as ethylene glycol, glycerol, cyclohexane diol, mononuclear di- or polyvalent phenols, bisphenols such as Bisphenol-A and Bisphenol-F, and polynuclear phenols; glycidyl ethers of fatty acids having, say, 6–24 carbon atoms; glycidyl(meth)acrylate; an isocyanurate group-containing epoxy compounds, an epoxydated olybutadiene; hydantoin-epoxy resins; epoxy resins obtained by epoxydation of aliphatic and/or cycloaliphatic alkenes, such as dipentene dioxide, dicyclopentadiene dioxide, and vinyl cyclohexene dioxide, and glycidyl groups-containing resins such as polyesters or polyurethanes containing one or more glycidyl groups per molecule, or mixtures of the epoxy resins in question. The epoxy group in these compounds is suitable for reaction with the amino-functional and thiol-functional vinyl ether, acetal, and alkoxysilane compounds.

Examples of at least difunctional isocyanate compounds suitable for use in the adduct in question include aliphatic, cycloaliphatic or aromatic di-, tri- or tetraisocyanates which may be ethylenically unsaturated or not, such as: 1,2-propylene diisocyanate, trimethylene diisocyanate, tetramethylene diisocyanate, 2,3-butylene diisocyanate, hexamethylene diisocyanate, octamethylene diisocyanate, 2,2,4-trimethyl hexamethylene diisocyanate, 2,4,4-trimethyl hexamethylene diisocyanate, dodecamethylene diisocyanate, ω,ω'-dipropyl ether diisocyainate, 1,3-cyclopentane diisocyanate, 1,2-cyclohexane diisocyanate, 1,4-cyclohexane diisocyanate, isophorone diisocyanate, 4-methyl-1,3-diisocyanato-cyclohexane, trans-vinylidene diisocyanate, dicyclohexyl methane-4,4'-diisocyanate, 3,3'-dimethyldicyclohexyl-methane-4,4'-diisocyanate, a toluene diisocyanate, 1,3-bis(isocyanatomethyl)benzene, a xylene diisocyanate, 1,5-dimethyl-2,4-bis(isocyanatomethyl) benzene, 1,5-dimethyl-2,4-bis(2-isocyanatoethyl)-benzene, 1,3,5-tri-ethyl-2,4-bis(isocyanatomethyl)-benzene, 4,4'-diisocyanatodiphenyl, 3,3'-dichloro-4,4'-diisocyanatodiphenyl, 3,3'-diphenyl-4,4'-diisocyanatodiphenyl, 3,3'-dimethoxy-4,4'-diisocyanatodiphenyl, 4,4'-diisocyanatodiphenyl methane, 3,3'-dimethyl-4,4'-diisocyanatodiphenyl methane, a diisocyanatonaphthalene, the adduct of 2 molecules of a diisocyanate, e.g., hexamethylene diisocyanate or isophorone diisocyanate, to a diol such as ethylene glycol, the adduct of 3 molecules of hexamethylene diisocyanate to 1 molecule of water (available under the trademark Desmodur N ex Bayer), the adduct of 1 molecule of trimethylol propane to 3 molecules of toluene diisocyanate (available under the trademark Desmodur L ex Bayer), the adduct of 1 molecule of trimethylol propane to 3 molecules of isophorone diisocyanate, compounds such as 1,3,5-triisocyanatobenzene and 2,4,6-triisocyanatotoluene, and the adduct of 1 molecule of pentaerythritol to 4 molecules of toluene diisocyanate. Preferably, an aliphatic or cycloaliphatic di- or triisocyanate having 8–36 carbon atoms is employed.

The isocyanate-functional compounds are suitable for reaction with the amino-functional, thiol-functional, and hydroxyl-functional vinyl ether, acetal, and alkoxysilane compounds.

As suitable di-, tri-, or polyvalent hydroxyl compounds may be mentioned ethylene glycol, propylene glycol, diethylene glycol, tetramethylene diol, neopentyl glycol, hexamethylene diol, cyclohexane diol, bis-(4-hydroxycyclohexyl) methane, glycerol, trimethylol ethane, trimethylol propane, tris(2-hydroxyethyl)isocyanurate, and pentaerythritol. Polyols and other suitable hydroxy-functional compounds such as polyester diols and polyols and polyether diols and polyols have been described, int. al., in H. Wagner and H. F. Sarx, *Lackkunstharze*, 5th edition, 1971. (Carl Hanser Verlag, München).

The polyols are suitable for reaction with isocyanate-functional vinyl ether, acetal, and alkoxysilane compounds.

Suitable ester compounds are esters of polycarboxylic acids and low-boiling alcohols. Examples are methyl, ethyl, n-propyl, isopropyl, n-butyl, sec-butyl, and tert-butyl esters of di-, tri- or tetracarboxylic acids, such as malonic acid, adipic acid, direric fatty acids, maleic acid, fumaric acid, cyclohexane-1,2-dicarboxylic acid, phthalic acid, isophthalic acid, cyclohexane-1,3-dicarboxylic acid, cyclohexane-1,4-dicarboxylic acid, thiophene-1,5-dicarboxylic acid, trimellitic acid, ethylene tetracarboxylic acid, acetylene dicarboxylic acid, and propane-1,1,2,3-tetracarboxylic acid. These compounds can enter into a reaction with hydroxy-functional and amino-functional vinyl ether, acetal or alkoxysilane compounds.

The compounds with an ethylenically or ethynylenically unsaturated group can be distinguished into compounds having electron-rich groups and compounds having electron-poor groups. The electron-rich groups can be divided up into two categories: those capable of reacting with hydroxyl-, amino-, and silylhydride-functional vinyl ether, acetal, or alkoxysilane compounds, and those capable of reacting only with silylhydride-functional vinyl ether, acetal or alkoxysilane compounds. Examples of electron-rich alkene or alkyn compounds reactive with hydroxyl, amino or silylhydride groups are: divinyl ethers, vinyl esters of polycarboxylic acids, polyenamines, poly(-1-alkenesulphides), dialkyl ethers, dialkyl thiolethers, alkyl esters of polycarboxylic acids.

Examples of electron-rich alkene or alkyne compounds also capable of reacting with silylhydride-functional compounds are: unsaturated fatty acids and their esters or amides, other unsaturated carboxylic acids, except for α,β-unsaturated carboxylic acids, and their esters or amides. Examples of compounds having electron-poor ethylenic or ethynylenic groups are α,β-unsaturated esters, amides, ketones, and other Michael acceptors known from the literature (such as described, e.g., in J. March, *Advanced Organic Chemistry, Reaction, Mechanism and Structure*, 4th Ed. (Wiley Interscience: 1992), p. 795 and the references cited therein).

Representative examples of compounds having at least 2 acryloyl or methacryloyl groups include the (meth)acrylic esters of di-, tri- or polyvalent polyols, including polyester polyols and polyether polyols; adducts of, on the one hand, a hydroxyl group-containing (meth)acrylic ester of a polyol to, on the other, an at least difunctional isocyanate compound; and adducts of (meth)acrylic acid to an at least difunctional epoxy compound.

According to the invention, preference is given to a coating composition in which the vinyl ether, acetal and/or alkoxysilane compounds are covalently bonded to the alkyd resin by addition via reactive group such as an amino, hydroxyl, thiol, hydride, epoxy and/or isocyanate group. To this end these compounds have to possess at least one group capable of forming an adduct with the reactive groups present in the alkyd resin. In one embodiment, the alkyd resin has substantially no unsaturated groups in the backbone.

To incorporate vinyl ether groups into the alkyd resin use is made of a vinyloxyalkyl compound the alkyl group of which is substituted with a reactive group, such as a hydroxyl, amino, epoxy or isocyanate group, which is capable of forming an adduct with one or more reactive groups present in the alkyd resin.

Examples of vinyl ether compounds capable of being covalently bonded to the alkyd resin by addition are ethylene glycol monovinyl ether, butane diol monovinyl ether, hexane diol monovinyl ether, triethylene glycol monovinyl ether, cyclohexane dimethanol monovinyl ether, 2-ethylhexane diol monovinyl ether, polytetrahydrofuran monovinyl ether, tetraethylene glycol monovinyl ether, trimethylol propane divinyl ether, and aminopropyl vinyl ether.

Adducts can be formed, e.g. by reacting the vinyl ether compound containing a hydroxyl group or amino group with an excess of a diisocyanate, followed by the reaction of this free isocyanate groups-containing adduct with the free hydroxyl groups of the alkyd resin. Preferably, a process is employed in which first the free hydroxyl groups of the alkyd resin are reacted with an excess of a polyisocyanate, after which the free isocyanate groups are reacted with an amino group- or hydroxyl group-containing vinyl ether compound. Instead of a diisocyanate, a diester may be employed. Transesterification of the hydroxyl groups present in the alkyd resin with an excess of ester groups of the diester, followed by transesterification or transamidation of the remaining ester groups with hydroxyl-functional vinyl ether compounds and amino-functional vinyl ether compounds, respectively, results in vinyl ether-functional alkyd resins. Instead of using the process discussed above in which an adduct is formed by reacting isocyanate, groups or ester groups with hydroxyl groups or amino groups, it is possible to incorporate (meth)acrylate groups into the alkyd resin during its preparation by carrying out the alkyd resin preparation in the presence of a hydroxy-functional (meth)acrylate ester, such as hydroxyethyl methacrylate (HEMA), and then converting the thus functionalised alkyd resin by means of a Michael reaction with a compound containing a vinyl ether group and a primary amino group, followed by reaction with, e.g., an isocyanate compound in order to obtain a non-basic nitrogen atom.

For the preparation of acetal-functionalised alkyd resins generally use is made of a dialkyl acetal functionalised with an amino group. Examples of suitable acetal compounds are 4-aminobutyraldehyde dimethyl acetal and 4-aminobutyraldehyde diethyl acetal. The alkyd resin is modified by adding the aminoacetal monomer to an alkyd resin functionalised with isocyanate groups, ester groups of a low-boiling alcohol, or (meth)acrylate groups. The thus obtained dialkyl acetal-modified alkyd resin can be incorporated into a coating composition having a high solids content and a low viscosity. Alternatively, the preparation of acetal-functionalised alkyd resins can take the form of reacting a hydroxyacetal with the carboxyl groups of the alkyd resin or by reacting a diisocyanate or diester compound with the hydroxyl groups of the alkyd resin.

For the incorporation of alkoxysilane groups into the alkyd resin use is made of a siloxane compound having one or more reactive groups which are subsequently reacted with one or more of the constituents making up the alkyd resin. In this process favourable results have been achieved using an alkoxysilane satisfying the formula:

, wherein $R_1$ has the meaning of an alkoxy or oxyalkylene alkoxy group or, if X stands for a hydrogen atom, of a halogen atom, $R_2$ has the meaning of an aliphatic, cycloaliphatic or aromatic group, and X stands for a hydrogen atom or an alkyl group substituted with an amino, isocyanate, mercapto or epoxy group, wherein a=1 through 3, b=1 through 3, c=0 through 2, and a+b+c=4.

$R_1$ preferably is a lower alkoxy group having 1 to 4 carbon atoms in the alkoxy group and $R_2$ preferably is a group having not more than 18 carbon atoms.

Examples of suitable siloxane compounds are 3-aminopropyl-triethoxysilane, polyglycol ether-modified aminosilane, 3-aminopropyl-trimethoxysilane, 3-aminopropyltris-methoxy-ethoxyethoxysilane, 3-aminopropyl-methyl-diethoxy silane, N-2-aminoethyl-3-aminopropyl-trimethoxy-silane, N-2-aminothyl-3-aminopropyl-methyldimethoxy-silane, N-methyl-3-aminopropyl-trimethoxysilane, 3-ureidopropyl-triethoxysilane, 3,4,5-dihydroimidazol-1-yl-propyltriethoxysilane, 3-methacryloxypropyl-trimethoxysilane, 3-glycidyloxypropyl-trimethoxysilane, 3-mercaptopropyl-trimethoxysilane, and 3-mercaptopropyl-methyl-dimethoxysilane, triethoxy-silane, diethoxymethyl silane, dimethoxymethyl silane, trimethoxysilane, trichlorosilane, triiodosilane, tribromosilane, dichloromethyl silane, and dibromomethyl silane.

The alkyd resin can be modified, e.g., by adding an amino group-modified alkoxysilane to an alkyd resin functionalised with a polyisocyanate or a polyester of a low-boiling alcohol. Hydride-functional alkoxysilanes can be bonded to the alkyd directly, i.e., without modification with a coupling molecule such as a diisocyanate or diester, by adding a compound containing a silylhydride group to an ethylenically unsaturated group in the alkyd resin. This addition is catalysed by a transition metal. In this process it is preferred to make use of a halogenated silylhydride and, on conclusion of the addition reaction, convert it into an alkoxysilane compound with a low-boiling alcohol. The addition reaction proceeds most favourably in the absence of sterically hindering groups and is optimal when the ethylenically unsaturated groups are terminal groups, as is the case with esters of 10-undecenecarboxylic acid. The thus obtained alkoxysilane-modified alkyd resin can be incorporated into, a coating composition having a high solids content and a low viscosity.

According to the invention, preference is given to a coating composition in which the ratio of the number of oxidatively drying groups present in the alkyd resin to the number of groups reactive in the presence of an acid is in the range of 1/10 to 15/1, with preference being given to a ratio in the range of 1/3 to 5/1. Instead of a single modified alkyd resin several alkyd resins may be employed, with one alkyd resin being highly modified and the others being less so or not at all. All that is of importance is the ratio of the number of oxidatively drying groups to the number groups reactive in the presence of an acid.

The pKa value of the acid under the influence of which the acid-reactive compounds are activated is <5, preferably <3. Examples of suitable acids are sulphonic acid derivatives, such as methane sulphonic acid, p-toluene sulphonic acid, dodecyl benzene sulphonic acid, phosphoric acid derivatives such as phosphoric acid dibutyl ester and/or suitable substituted carboxylic acid derivatives such as trichloroacetic acid and trifluoroacetic acid. Up to now, optimum results have been obtained using phosphoric acid dibutyl ester.

The photo-initiators suitable for use according to the invention generally are compounds activated by low UV-intensities and daylight. Suitable photo-initiators are acyl phosphine oxides, thioxanthone compounds, and mixtures thereof. Both monoacylphosphine oxide photoinititors, such as are disclosed, for example, in EP-A-0 007 508 and EP-0 413 657, and bisacylphosphine oxide photoinitiators, such as are disclosed, for example, in EP-A-0 184 095, EP-A-0 413 657, GB 2,259,704, and GB 2,292,740, can be used as photo-initiators in the coating composition of the present invention. An example of a monoacylphosphine oxide photo-initiator is (2,4,6-trimethylbenzoyl)-diphenyl-phosphine oxide (Lucirin® TPO). Examples of bisacylphosphine oxide photo-initiators include bis(2,6-dimethoxybenzoyl)-2,4,4-trimethylpentyl-phosphine oxide, bis(2,6-dimethoxybenzoyl)-2,2,4-trimethylpentyl-phosphine oxide, and bis(2,4,6-trimethylbenzoyl)-phenyl-phosphine oxide. Examples of thioxanthone compounds include 2-isopropyl-thioxanthone, 1-chloro-4-propoxythioxanthone, 2,4-diethoxy thioxanthone, and 2-chlorothioxanthone. Very favourable results have been obtained up to now using bis(2,6-dimethoxybenzoyl)-2,4,4-trimethylpentyl-phosphine oxide as photoinitiator.

In general, favourable results are obtained when the photo-initiator is present in an amount of 0,01 to 5 wt. %, calculated on the overall amount of ethylenically unsaturated alkyd resin present. In this case preference is given to an amount in the range of 0,01 to 2 wt. %, more particularly, in the range of 0,05 to 2 wt. %. When a sensitiser is employed, preference is given to an amount making up 10 to 200 wt. % of the photo-initiator.

While the ethylenically unsaturated alkyd resin is cured by oxidative drying under the influence of a photo-initiator, the vinyl ethers, acetals and/or alkoxysilanes are cured under the influence of an acid and, in the case of acetals and/or alkoxysilanes, also in the presence of a small amount of moisture from the air. Thus, in order to enhance the storage stability of the coating compositions according to the invention, advantageous use is made of a photo-initiator which releases an acid under the influence of electromagnetic radiation. Such photo-initiators have been disclosed, int. al., by G. Li Bassi et al. in "Photoinitiators for the simultaneous generation of free radicals and acid hardening catalysts," in a paper distributed during a symposium of Chemspec Europe 87 BACS.

As an example may be mentioned the compound (MDTA), 2-methyl-1-[4-(methylthiophenyl]-2-[4-methylphenylsulphonyl]propan-1-one, which is commercialised by Fratelli Lamberti Spa, Varese, Italy.

Other latent acids are disclosed, for example, in EP-A-0 139 609, EP-A-0 164 314, EP-A-0 199 672, EP-A-0 571 330, EP-A-0 780 729, and GB 2,306,958.

Alternatively, use may be made of latent acids which are unblocked with moisture from the air. As an example may be mentioned the silyl esters of sulphonic acids, such as trimethylsilyl p-toluene sulphonic acid.

Generally, a small amount of organic solvents is incorporated into the coating compositions according to the invention. Preference is given in that case to solvents which have a flashpoint of at least 55° C. and a boiling point in the range of 140° C. to 260° C. As an example may be mentioned aliphatic, cycloaliphatic or aromatic hydrocarbons having on average 9–16 carbon atoms per molecule, alcohol ethers, and alcohol ether acetates or mixtures thereof. Examples of such solvents include the hydrocarbon solvents available under the trademarks Shellsol H, Shellsol K, and Shellsol AB, all ex Shell Chemicals, and Solvesso-150 ex Esso, as well as compounds such as ethyl diglycol, ethyl glycol acetate, butyl glycol, butyl glycol acetate, butyl diglycol, butyl diglycol acetate, and methoxypropylene glycol acetate. Preferably, the solvent has a boiling point in the range of 170° C. to 230° C. If so desired, small amounts of ethers, esters, ketones, alcohol esters, and alcohols and glycols may be present in the coating composition.

If so desired, the coating composition according to the invention may contain all sorts of additives or adjuvants, e.g., pigments, dyes, fillers, anti-oxidants, anti-ozonants, gloss-reducing agents, thixotropic agents, sterically hindered amines, bactericides, fungicides, anti-skinning agents, perfumes, anti-foaming agents, drying stabilisers, finely dispersed waxes and polymers such as hydrocarbon resins, colophonium resins, phenol resins, and ketone resins.

Suitable pigments are, e.g., natural or synthetic pigments which may be transparent or not. Examples of suitable pigments are titanium dioxide, red iron oxide, orange iron oxide, yellow iron oxide, phthalocyanine blue, phthalocyanine green, molybdate red, chromium titanate, and earth colours such as ochres, green earths, umbers, and burnt or raw Siennas. In general, pigments for finishes are used in an amount of not more than 150 wt. %, preferably 50–125 wt. %, vis-à-vis the alkyd resin (calculated as dry solid). Examples of suitable thixotropic agents are inorganic agents such as organically modified magnesium montmorillonites, e.g., those available under the trademarks Bentone 27 and 38 ex National Lead Co., but preferably adducts of a diisocyanate, say, hexamethylene diisocyanate, to a monoamine or hydroxy-monoamine having 1 to 5 aliphatic carbon atoms, e.g., benzyl amine, adducts of a symmetric aliphatic or homocyclic diisocyanate to a mono- or diamine having at least a primary amino group and an ether group, and adducts of an isocyanurate-trimer of a diisocyanate having 3–20 carbon atoms to an amine having one or more primary amino groups.

The coating compositions can be applied to a substrate in any suitable manner, e.g., by means of roller coating, spraying, brushing, sprinkling, flow coating or dipping. Preferably, the composition is applied by brushing.

Suitable substrates include metals or synthetic materials, wood, concrete, cement, brick, paper or leather, all of which may have been pre-treated or not. Suitable metals include :iron, steel, and aluminium. The applied coat can be cured very suitably at a temperature of, e.g., 0–40° C. Optionally, a curing temperature above 40° C. may be employed, as a result of which the curing time can be reduced.

The invention will be further illustrated with reference to the following examples. Needless to say, these are exemplified embodiments to which the invention is not limited. Unless otherwise specified, "parts" stands for "parts by weight" and "%" for "per cent by weight" in what follows. The solids content SC was calculated or determined in accordance with ISO 3251-1993 after one hour of heating at 120° C. and is given in wt. %. The viscosity was determined at 23° C. using a viscosimeter as specified by Brookfield (spindle 4 and motor set at 30) and is given in cPa·s. The acid value and the hydroxyl number value are given in mg KOH per gram of resin. The molecular weights were determined by means of GPC (THF as mobile phase and polystyrene as standard). The coating compositions to be tested each had a viscosity of ±40 cPa·s (Cone and Plate, 10 000 s$^{-1}$) as a result of dilution with butyl acetate. They were cured with the aid of a BK drying recorder originating from The Mickle Lab. England Co., Gomshall, Surrey, England.

The results obtained in this fashion can be classified as follows:

Phase 1 :the line traced by the pin closes up again.
Phase 2 :the pin traces a scratchy line ("dust free").
Phase 3 :the pin traces a straight line in the paint which does not close up again.
Phase 4 :the pin leaves no further trace ("hardened through").

The outcome is indicated per phase through the number of hours during which the pin shows the effect for that particular phase. The more hours listed for a particular phase, the slower the curing process will proceed during that phase.

The strength of the film was determined with a fingernail on films applied to a sheet of glass in such a thickness as to give a dry film of 40–50 μm. In this process the nail is put at right angles to the film and moved slightly.

The results of this test are represented as follows:

- - -=Film damaged by exerting minimal pressure on substrate
- -'=Film damaged by exerting slight pressure
- ±=Film damaged by exerting pressure
- +=Film not damaged, but deformed (nail imprint remains visible)
- ++=Film not damaged (no remaining nail imprint).

The abbreviations used in the examples below have the following meanings:

| | |
|---|---|
| AMEO-T | :3-aminopropyl triethoxysilane (Mw = 222) |
| BAPO | :bis(2,6-dimethylbenzoyl)-2,4,4-trimethylpentyl phosphine oxide |
| DEM | :diethyl malonate |
| HBVE | :4-hydroxybutyl vinyl ether |
| PENTA | :pentaerythritol |
| MA | :maleic anhydride |
| IPDI | :isophorone diisocyanate |
| DBF | :phosphoric acid dibutyl ester |
| MDTA | :2-methyl-1-[4-(methylthiophenyl]-2-[4-methylphenylsulphonyl] propan-1-one (latent acid ex Fratelli Lamberti Spa, Italy) |
| SC | :solids content (determined after 60 minutes of drying at 120° C. in accordance with ISO 3251-1993). |

EXAMPLE I

1.1 Preparation of Hydroxyl-Functional Alkyd Resin 1697 (6.0 moles) parts of ricinenic fatty acid (commercially available as Nouracid DE554 ex Akzo Nobel Chemicals), 409 g (3.0 moles) of PENTA, and 2.1 g of maleic acid were mixed and heated, with constant stirring, to 185° C. over 50 minutes. At 240° C. xylene was added, and the water of reaction was removed, with refluxing, until an acid value of 1.7 was achieved. After cooling an alkyd resin having the following properties was obtained, the values listed being related to a solids content of 100%.

| | |
|---|---|
| Solids content SC (theory) | 100 |
| Acid value mg KOH/g | 1.7 |
| Hydroxyl number (theory) mg KOH/g | 169 |
| Number average molecular weight Mn | 1323 |
| Weight average molecular weight Mw | 1661 |

1.2 Preparation of Alkoxysilane-functional Alkyd Resin (Alkyd Resin A)

560 g (1.69 hydroxyl equivalent) of the alkyd resin prepared above were mixed with 263 g (1.64 moles) of DEM in 17.5 g of xylene, after which the mixture was heated to 197° C. and kept for 80 minutes at said temperature with refluxing. After removal of the ethanol the temperature was lowered to 122° C. and 381 g (1.72 moles) of AMEO-T were added, followed by an increase in the temperature to 200° C. and distilling off of ethanol. When, after 30 minutes, no; further ethanol came over, the pressure was lowered to 600 mbar. Next, another 85 g of ethanol was distilled off. After removal of the xylene from the reaction mixture there was obtained an alkoxysilane-functional alkyd resin having the following properties:

| | |
|---|---|
| Solids content SC (theory) | 100 |
| Acid value mg KOH/g | 0.8 |
| Number average molecular weight Mn | 1774 |
| Weight average molecular weight Mw | 3905 |
| Viscosity in cPa.s | 49 |

EXAMPLE II

2.1 Preparation of Hydroxyl-functional Alkyd Resin

In a three-necked flask equipped with a stirrrer and a distillation column a mixture composed of 12t5 g (4.5 moles) of ricinenic fatty acid (commercially available as Nouracid DE554 ex Akzo Nobel Chemicals), 246 g (1.8 moles) of PENTA, and 1.5 g of MA was heated to 186° C., with the water released during the reaction being distilled off. Next, 188 g of xylene were added, and the reaction mixture was heated at 240° C., with refluxing, until no further water came over. After cooling with nitrogen the reaction mixture was left to stand overnight, after which the xylene was distilled off in vacuo at a temperature <200° C. The intermediate product had the following properties:

| | |
|---|---|
| Solids content SC (theory) | 100 |
| Acid value mg KOH/g | 1.0 |
| Number average molecular weight Mn | 1378 |
| Weight average molecular weight Mw | 1745 |
| Viscosity, cPa.s | 25 |
| OH-number (theory) | 105 |

2.2 Preparation of Alkoxysilane-functional Alkyd Resin (Alkyd Resin B)

Charged into a 2000 ml three-necked flask equipped with a stirrer and a distillation column was a mixture composed of 154 g of methoxypropyl acetate, 294 g (2.64 eq. NCO) of IPDI, and 0.3 g of dibutyl tin dilaurate, after which the temperature was raised to 80° C. To this mixture were added, over a period of 2 hours, 705 g (1.32 eq. hydroxyl) of the hydroxyl-functional alkyd resin prepared as specified in 2.1. On conclusion of the dosing a further 35 g of methoxypropyl acetate were added, and the reaction mixture was stirred at about 80° C. until the content of free isocyanate was 4.68%, based on the solution. The reaction mixture was then cooled to 25 to 30° C., and over a period of 1 hour 280 g (1.27 moles) of AMEO-T were added, with care being taken to ensure that the temperature did not rise above 40° C. After cooling 321 g of methoxypropyl acetate were added. When the free isocyanate content was no longer subject to change, 44 g of n-butanol were added. The thus obtained product had the following properties:

| | |
|---|---|
| Acid value mg KOH/g | 0.4 |
| Viscosity cPa.s | 65 |
| Number average molecular weight Mn | 2088 |
| Weight average molecular weight Mw | 3169 |
| Solids content SC (theory) | 70.0 |

EXAMPLE III

Preparation of Acetal-functional Alkyd Resin
(Alkyd Resin C)

250 g (0.75 hydroxyl equivalent) of the alkyd resin prepared as specified in 1.1 were mixed with: 114 g (0.72 mole) of DEM in xylene, after which the mixture was heated to 180° C. and kept at that temperature with refluxing. After removal of the ethanol the temperature was lowered to 100° C., and 93.8 g (0.71 mole) of 4-aminobutyraldehyde dimethyl acetal were added, followed by an increase in the temperature to 180° C. and distilling off of ethanol. The remaining ethanol was then removed under reduced pressure. Obtained was an acetal-functional alkyd resin having the following properties:

| | |
|---|---|
| Solids content SC (theory) | 100 |
| Amine number mg KOH/g | 0.5 |
| Number average molecular weight Mn | 1421 |
| Weight average molecular weight Mw | 5280 |
| Viscosity in cPa.s | 902 |

EXAMPLE IV

Preparation of Vinyl Ether-functional Alkyd Resin
(Alkyd Resin D)

A mixture of 141 g (0.55 mole) of dipentaerythritol and 614 g (2.2 moles) of ricinenic fatty acid (commercially available as Nouracid DE554 ex Akzo Nobel Chemicals) was mixed and heated to 240° C., after which xylene was added and the water of reaction was removed, with refluxing, until an acid value<2 was achieved. Following cooling to 160° C. the xylene was removed under reduced pressure. Next, 178 g (1.1 moles) of DEM and 129 g (1.1 moles) of HBVE were added. The transesterification reaction started at 155° C., with formed ethanol being distilled off. After removal of the remaining ethanol at 155° C. and 15 mBar a product having the following properties was obtained:

| | |
|---|---|
| Solids content SC (theory) | 100 |
| % free HBVE (determined by liquid chromatography, HPLC) | <0.1% |
| Number average molecular weight Mn | 2284 |
| Weight average molecular weight Mw | 7731 |
| Viscosity in cPa.s | 100 |

EXAMPLES V AND VI AND COMPARATIVE EXAMPLE A (WITHOUT ACID)

50.3 parts of alkyd resin A of, Example I were mixed with 50 parts of a commercially available alkyd resin (SETAL 294-SK94 ex Akzo Nobel Resins) with a high solids content and the following composition:

| | |
|---|---|
| Acid value | 14 |
| Hydroxyl number | 40 |
| Viscosity, Pa.s | 4.5 |
| Number average molecular weight Mn | 1600–2000 |
| Oil length | 85 |
| Solids content SC | 94 | and 5.2 parts of a 10% solution of the photo-initiator BAPO in butanol, 0, 2.6, and 5 parts, respectively, of a 10% solution of DBF in butyl acetate, 5, 2.5, and 1.5 parts., respectively, of n-butanol, as well as 5, 2.5, and 1,5 parts, respectively, of methoxypropyl acetate.

The composition of the tested compositions (in parts by weight), the drying results, and the film properties of the topcoats applied with the compositions are listed in Table 1.

TABLE 1

| Example | A (comparison) | V | VI |
|---|---|---|---|
| Alkyd resin A | 50.3 | 50.3 | 50.3 |
| SETAL 294-SK94 | 50 | 50 | 50 |
| 10 wt. % sol. DBF | 0 | 2.6 | 5 |
| 10 wt. % sol. BAPO | 5.2 | 5.2 | 5.2 |
| n-butanol | 5 | 2.5 | 1.5 |
| methoxypropyl acetate | 5 | 2.5 | 1.5 |
| BK recorder Phase 1 | 2.75 | 1.75 | 1 |
| Phase 2 | 3.75 | 2.5 | 1.5 |
| Phase 3 | 9.5 | 7.25 | 3.25 |
| Phase 4 | 21 | 9 | 3.25 |
| film strength after 1 week | ± | ± | ± |

The results listed in Table 1 clearly show that the curing of alkyd resin A (in the absence of an acid) proceeds too slowly for it to be used successfully in house paints, this despite the fact that the final film strength of all topcoats after 1 week was sufficient.

EXAMPLES VII TO XII AND COMPARATIVE EXAMPLES B TO I

Alkyd resin B was tested in an analogous manner in combination with SETAL 294-SK94.

Comparative example B shows the drying time for a Setal 294-SK94-containing composition into which, unlike in the case of the compositions according to the invention, groups which react in the presence of an acid have not been incorporated, but a cobalt siccative for the oxidatively drying alkyd resin has. Comparative examples D to F show the result of the combined use of a metal siccative and an acid in the curing of groups which are cured under the influence of an acid. Comparative examples C, G, H, and I clearly show that without the acid required to.activate the groups reacting in the presence of an acid, curing after 24 hours in particular is unsatisfactory. The composition of the coating compositions and the results of the drying tests performed are listed in Table 2.

TABLE 2

| Example | B | C | D | E | F | G | VII |
|---|---|---|---|---|---|---|---|
| Alkyd resin B | | 68.1 | 68.1 | 68.1 | 68.1 | 68.1 | 68.1 |
| Setal 294-SK94 | 100 | 50 | 50 | 50 | 50 | 50 | 50 |
| Cobalt salt | 0.6 | 0.6 | 0.6 | 0.6 | 0.6 | | |
| methylethyl ketoxime | 0.54 | 0.54 | 0.54 | 0.54 | 0.54 | | |
| white spirit | | 7.3 | 7.3 | 7.3 | 7.3 | 7.3 | 7.3 |

TABLE 2-continued

| | | | | | | | |
|---|---|---|---|---|---|---|---|
| 10% sol. DBF | | | 1.4 | 2.5 | 10.6 | | 2.5 |
| BAPO | | | | | | 0.1 | 0.1 |
| BK recorder | 2 | 2 | 3 | 0.75 | 0.25 | 2 | 0.5 |
| Phase 1 | | | | | | | |
| Phase 2 | 2.75 | 2.25 | 4 | 2.75 | 0.25 | 3 | 0.75 |
| Phase 3 | 3.25 | 2.5 | 7.25 | 9.5 | 0.75 | >18 | 2 |
| Phase 4 | 3.5 | 3.25 | 14.5 | 13.75 | 1.5 | | 2.5 |
| film strength after 1 day | + | + | + | ± | -- | - | - |
| film strength after 1 week | + | + | + | + | + | + | + |

| Example | VIII | H | IX | X | I | XI | XII |
|---|---|---|---|---|---|---|---|
| Alkyd resin B | 68.1 | 68.1 | 68.1 | 68.1 | 68.1 | 68.1 | 68.1 |
| Setal 294-SK94 | 50 | 50 | 50 | 50 | 50 | 50 | 50 |
| white spirit | 7.3 | 7.0 | 4.0 | 2.0 | 7.3 | 7.3 | 7.3 |
| 10% sol. DBF | 5 | | 2.5 | 5 | | 2.5 | 5 |
| BAPO | 0.1 | 0.5 | 0.5 | 0.5 | 1.0 | 1.0 | 1.0 |
| BK recorder | <0.25 | 1.5 | 0.5 | 0.25 | 1.25 | 0.25 | 0.25 |
| Phase 1 | | | | | | | |
| Phase 2 | 0.25 | 2.25 | 0.75 | 0.25 | 1.75 | 0.5 | 0.25 |
| Phase 3 | 1 | >18 | 1.75 | 1 | 11.5 | 1 | 1 |
| Phase 4 | 2.25 | | 2.25 | 1 | 16.25 | 1.75 | 1 |
| film strength after 1 day | - | - | ± | ± | ± | ± | ± |
| film strength after 1 week | + | + | + | + | + | + | + |

The results listed in Table 2 clearly show that the most rapid curing is achieved when use is made of a binder composition based on an oxidatively drying alkyd resin having acid reactive groups in combination with an acid and a radical initiator.

EXAMPLES XIII AND XIV AND COMPARATIVE EXAMPLES J–M

The acetal-functional alkyd resin C was mixed with an equal amount by weight of Setal 294-SK94. The initiator/catalyst used was a 10% solution of the photo-initiator BAPO in butanol, in combination or not with the latent acid MDTA, with dodecyl benzene sulphonic acid (DDBSA), or just with DDBSA, BAPO, or a standard drier combination based on a cobalt siccative (0,06 wt. % Co based on the solid constituents) and a six-fold equimolar excess of the anti-skinning agent methylethyl ketoxime.

The evaluation was carried out in a conditioned room (23° C., 55% RH). For lighting use was made of fluorescent light (TL055 ex Philips). The composition of the coating compositions and the results of the drying tests performed are listed in Table 3.

TABLE 3

| Example | XIII | XIV | J | K | L | M |
|---|---|---|---|---|---|---|
| Alkyd resin C | 50 | 50 | 50 | 50 | 50 | 50 |
| Setal 294-SK94 | 50 | 50 | 50 | 50 | 50 | 50 |
| % Co-salt | | | | | | 0,06 |
| % BAPO | 0,5 | 0,5 | | | 0,5 | |
| % MDTA | 1 | | 1 | | | |
| % DDBSA | | 1 | | 1 | | |
| BK recorder Phase 1 | 2,75 | 0,75 | 6,5 | 8,25 | 2 | 1,5 |
| Phase 2 | 5,25 | 1,75 | 10,75 | >21 | 3,25 | 5,25 |
| Phase 3 | >20 | 9,25 | >20 | | 4 | 9,75 |
| Phase 4 | | >21 | | | 6,75 | >21 |
| film strength after 1 day | ± | ± | — | | — | — |

The results listed in Table 3 clearly show that the most rapid curing is achieved when use is made of a binder composition based on an oxidatively drying alkyd resin having acid reactive groups in combination with an acid which may be blocked or not and a radical initiator.

EXAMPLE XV AND COMPARATIVE EXAMPLE N–O

In a manner analogous to that indicated in Example XIII, the vinyl ether-functional alkyd resin D was mixed with an equal amount by weight of Setal 294-SK94. The initiator/catalyst used was a 10% solution of the photo-initiator BAPO in butanol, in combination or not with the latent acid MDTA. In addition, for comparative purposes a mixture of alkyd resin D and Setal 294-SK94 was dried in the absence of both initiator and latent acid. The composition of the coating compositions and the results of the drying tests performed in the presence of fluorescent light (TL055 ex Philips) are listed in Table 4.

TABLE 4

| Example | XV | N | O |
|---|---|---|---|
| Alkyd resin D | 50 | 50 | 50 |
| Setal 294-SK94 | 50 | 50 | 50 |
| % BAPO | 0,5 | 0,5 | |
| % MDTA | 1 | | |
| % SC | 86,4 | 86,7 | |
| η(cPa.s) start | 40 | 41 | 39 |
| η(cPa.s) after 5 weeks | 96 | 74 | 64 |
| BK recorder Phase 1 | 1 | 1,5 | >20 |
| Phase 2 | 2,25 | 2,5 | |
| Phase 3 | 2,5 | 3 | |
| Phase 4 | 4,5 | >20 | |

The results listed in Table 4 clearly show that the most rapid curing is achieved when use is made of a binder composition based on an oxidatively drying alkyd resin having acid reactive groups in combination with a blocked acid and a radical initiator.

The drying tests of Table 4 were repeated, with the proviso that this time they were carried out in the presence of fluorescent light with a higher content of UV-light. In this process use was made of four fluorescent lights of 40 Watt each (TL03 ex Philips, $\lambda_{max}$ at 420 nm) positioned at a distance of about 20 cm from the object to be cured. The outcome of the measurements is listed in Table 5.

TABLE 5

| Example | XV | O |
|---|---|---|
| Alkyd resin D | 50 | 50 |
| Setal 294-SK94 | 50 | 50 |
| % BAPO | 0,5 | 0,5 |
| % MDTA | 1 | |
| % SC | 86,4 | 86,7 |
| η(cPa.s) start | 40 | 41 |
| η(cPa.s) after 5 weeks | 96 | 74 |
| BK recorder Phase 1 | <0,1 | 0,5 |
| Phase 2 | 0,6 | 1 |
| Phase 3 | 1,1 | 1,6 |
| Phase 4 | 2 | 3,25 |

The results listed in Table 5 clearly show that the effect of rapid curing according to the invention is much more manifest in the case of exposure of light using a radiation source with a higher percentage of UV-light. While it is possible to achieve comparatively rapid drying using just BAPO, the film strength finally obtained remains insufficient.

The major increase in viscosity after a residence time of 6 weeks at 50° C. can be reduced substantially by lowering the acid value of Setal 294-SK94 from 14 (see Examples V and VI) to less than 1. When 50 parts of such a resin with a lowered acid value (e.g., 0,7) are mixed with 50 parts of the vinyl ether-functional alkyd resin D of Example IV, the viscosity at 50° C. after one week will only increase from 32 to 39 cPa·s and after six weeks at 50° C. it will only have increased to 45 cPa·s.

What is claimed is:

1. A non-aqueous coating composition comprising an oxidatively drying alkyd resin, a photo-initiator, an acid or latent acid and one or more vinyl ethers, acetals, or alkoxysilanes which are reactive in the presence of an acid.

2. A coating composition according to claim 1, wherein the one or more vinyl ethers, acetals and/or alkoxysilanes are covalently bonded to the alkyd resin.

3. A coating composition according to claim 2, wherein the coating composition includes one or more vinyl ethers in the form of vinyl ether groups in the alkyd resin and the vinyl ether groups are obtained by the incorporation therein of a vinyloxyalkyl compound the alkyl group of which is substituted with a hydroxyl, amino, epoxy or isocyanate group.

4. A coating composition according to claim 2, wherein the coating composition includes one or more acetals in the form of acetal groups in the alkyd resin and the acetal groups are obtained by the incorporation therein of a dialkyl acetal functionalised with an amino group.

5. A coating composition according to claim 2, wherein the coating composition includes one or more alkoxysilanes in the form of alkoxysilyl groups in the alkyd resin and the alkoxysilyl groups are obtained by the incorporation therein of an alkoxysilane of the formula

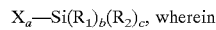

$X_a$—$Si(R_1)_b(R_2)_c$, wherein $R_1$ is an alkoxy or oxyalkylene alkoxy group or, if X stands for a hydrogen atom, is a halogen, $R_2$ is an aliphatic, cycloaliphatic or aromatic group, and X stands for a hydrogen atom or an alkyl group substituted with an amino, isocyanate, mercapto or epoxy group, with a=1 through 3, b=1 through 3, c=0 through 2, and a+b+c=4.

6. A coating composition according to claim 1, wherein the oxidatively drying alkyd resin has oxidatively drying groups and the ratio of the number of oxidatively drying groups present In the alkyd resin to the number of vinyl ethers, acetals, or alkoxysilanes which are reactive in the presence of an acid is in the range of 1/10 to 15/1.

7. A coating composition according to claim 6, wherein the oxidatively drying alkyd resin has oxidatively drying groups and the ratio of the number of oxidatively drying groups present in the alkyd resin to the number of vinyl ethers, acetals, or alkoxysilanes which are reactive in the presence of an acid is in the range of 1/3 to 5/1.

8. A coating composition according to claim 1, wherein the acid has a pKa value<5.

9. A coating composition according to claim 8, wherein the acid has a pKa value<3.

10. A coating composition according to claim 1, wherein the acid is a compound selected from the group consisting of sulphonic acid derivatives, phosphoric acid derivatives and substituted carboxylic acid derivatives.

11. A coating composition according to claim 10, wherein the acid is the phosphoric acid dibutyl ester.

12. A coating composition according to claim 10, wherein the sulphonic acid derivatives are selected from the group consisting of methane sulphonic acid, p-toluene sulphonic and dodecyl benzene sulphonic acid, the phosphoric acid derivative is phosphoric acid dibutyl ester, and the carboxylic acid derivatives are selected from the group consisting of trichloroacetic acid and trifluoroacetic acid.

13. A coating composition according to claim 1, wherein the acid present in the latent acid is released by a photo-induced reaction.

14. A coating composition according to claim 1, wherein the acid present in the latent acid is released by hydrolysis.

* * * * *

UNITED STATES PATENT AND TRADEMARK OFFICE
CERTIFICATE OF CORRECTION

PATENT NO.    : 6,548,565 B1
DATED         : April 15, 2003
INVENTOR(S)   : Van Den Berg et al.

It is certified that error appears in the above-identified patent and that said Letters Patent is hereby corrected as shown below:

Column 15,
Lines 35-37, "$X_a\text{-Si}(R_1)_b(R_2)_c,{}^{\text{wherein}}$" should read -- $X_a\text{-Si}(R_1)_b(R_2)_c$, wherein --

Column 16,
Line 7, "groups present In the alkyd" should read -- groups present in the alkyd --

Signed and Sealed this

Twenty-third Day of September, 2003

JAMES E. ROGAN
*Director of the United States Patent and Trademark Office*